United States Patent [19]
Cowan, II et al.

[11] Patent Number: 5,515,406
[45] Date of Patent: * May 7, 1996

[54] INTERNAL PASSSIVE CATALYTIC AMMONIA CONVERTER FOR REDUCTION OF MAIN STEAM DOSE RATE ASSOCIATED WITH HYDROGEN WATER CHEMISTRY

[75] Inventors: Robert L. Cowan, II, Livermore; Gerald M. Gordon, Soquel; Robert J. Law, Livermore; Beth A. McAllister, San Jose, all of Calif.

[73] Assignee: General Electric Company, San Jose, Calif.

[*] Notice: The portion of the term of this patent subsequent to Nov. 25, 2012, has been disclaimed.

[21] Appl. No.: 65,964

[22] Filed: May 21, 1993

Related U.S. Application Data

[63] Continuation-in-part of Ser. No. 982,176, Nov. 25, 1992, Pat. No. 5,285,486.

[51] Int. Cl.$^6$ ............................................. G21C 19/317
[52] U.S. Cl. ............................................. 376/301; 423/579
[58] Field of Search ................................... 376/300, 301; 423/579, 580.1, 582, 584

[56] References Cited

U.S. PATENT DOCUMENTS

| | | | |
|---|---|---|---|
| 2,863,729 | 12/1958 | McDuffie | 23/204 |
| 2,945,794 | 7/1960 | Winters et al. | 204/154.2 |
| 2,961,391 | 11/1960 | King | 204/193.2 |
| 3,663,725 | 5/1972 | Pearl | 376/306 |
| 4,171,350 | 10/1979 | Sanders | 423/580 |
| 4,226,675 | 10/1980 | Lewis et al. | 376/301 |
| 4,282,062 | 8/1981 | Stiefel et al. | 376/306 |
| 4,374,083 | 2/1983 | Deinlein et al. | 376/306 |
| 4,574,071 | 3/1986 | deSilva et al. | 422/14 |
| 4,789,488 | 12/1988 | deSilva | 210/750 |
| 4,842,811 | 6/1989 | Desilva | 376/301 |
| 5,130,081 | 7/1992 | Niedrach | 376/305 |
| 5,135,709 | 8/1992 | Andresen et al. | 376/305 |
| 5,147,602 | 9/1992 | Andresen et al. | 420/35 |

FOREIGN PATENT DOCUMENTS 0467110  6/1991  European Pat. Off. .......... C01B 5/00

OTHER PUBLICATIONS

Cowan et al., "U.S. Experience with Hydrogen Water Chemistry in BWRs", Japan Atomic Ind. Forum Water Chem. Conf., Tokyo (1988).

Cowan et al., "Experience with hydrogen water chemistry etc.", Water Chem. for Nucl. Reactor Systems 4, BNES, London (1986), 29–36.

Ullberg et al., "Hydrogen Peroxide in BWRs", Water Chem. for Nucl. Reactor Systems, 4, BNES, London (1987), pp. 67–73.

Ruiz et al., "Model Calculations of water radiolysis in BWR primary coolant," Water Chem. of Nucl. Reactor Systems 5, BNES, London (1989), pp. 131–140.

BWR Hydrogen Water Chemistry Guidelines: 1987 Revision, EPRI NP–4947–SR, Dec. 1988.

(List continued on next page.)

*Primary Examiner*—Daniel D. Wasil
*Attorney, Agent, or Firm*—James E. McGinness

[57] ABSTRACT

A passive catalytic ammonia converter operating in the water/steam mixture exiting the core of a boiling water reactor. The catalytic ammonia converter is made of catalytic material arranged and situated such that substantially all of the water/steam mixture entering the water/steam separator device flows over the surface of the catalytic material. The catalytic surfaces react ammonia and/or NO with $O_2$ or $H_2O_2$ in the water/steam mixture to form nitrite or nitrate. The passive catalytic ammonia converter is constructed to ensure that the pressure drop of the reactor water across the device is very small. The catalytic ammonia converter can include a plurality of stainless steel flow-through housings packed with catalytic ammonia converter material, which could take the form of tangled wire or strips, crimped ribbon, porous sintered metal composite or any other structure having a high surface area-to-volume ratio.

20 Claims, 9 Drawing Sheets

OTHER PUBLICATIONS

Rao et al., "Protective coatings for radiation control etc.," J. Vac. Sci. Technol. A 5(4), Jul./Aug. 1987, pp. 2701–2705.

Kim et al., "The Application of Noble Metals in Light–Water Reactors", JOM, Apr. 1992, pp. 14–18.

Niedrach, "Effect of Palladium Coatings on the Corrosion Potential of Stainless Steel etc.", Corrosion, vol. 47, No. 3 (1991) pp. 162–169.

Rogers et al., "Catalytic recombiners for BWRs", Nucl. Eng. Int'l, Sep. 1973, pp. 711–715.

Indig et al., "Mitigation of SCC in an operating BWR via $H_2$ injection", Int'l Corrosion Forum, Anaheim, Apr. 1983.

Jones et al., "Controlling SCC in BWR Piping by Water Chemistry Modification", NACE Symposium, Corrosion '84, New Orleans, 1984.

INTERNAL PASSSIVE CATALYTIC AMMONIA CONVERTER FOR REDUCTION OF MAIN STEAM DOSE RATE ASSOCIATED WITH HYDROGEN WATER CHEMISTRY

This is a continuation-in-part of U.S. patent application Ser. No. 07/982,176 filed on Nov. 25, 1992, issued on Feb. 8, 1994 as U.S. Pat. No. 5,285,486.

FIELD OF THE INVENTION

This invention relates to reducing the main steam dose rate in a boiling water reactor ("BWR") under hydrogen water chemistry conditions. In particular, the invention relates to the catalytic reaction of undesirable volatile $^{16}$N-containing species present in the coolant of a BWR.

BACKGROUND OF THE INVENTION

In a BWR, the high-temperature (~288° C.) water coolant is highly oxidizing due to dissolved radiolytically produced chemical species, such as oxygen and hydrogen peroxide. These molecules and/or compounds are generated as water passes through the reactor core and is exposed to very high gamma and neutron flux levels. Because of the resultant high electrochemical potential ("ECP"), reactor structural materials, such as stainless steels and nickel-based alloys, can suffer stress corrosion cracking ("SCC").

It is well known that SCC occurs when oxygen is present in the reactor water in concentrations of about 5 ppb or greater. Stress corrosion cracking is further increased in a high radiation flux where oxidizing species, such as oxygen, hydrogen peroxide, and short-lived radicals are produced from radiolytic decomposition of the reactor water. Such oxidizing species increase the ECP of metals. Electrochemical corrosion is caused by a flow of electrons from anodic and cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

The useful lifetime of reactor components, such as piping and pressure vessel internal structures, can be limited by SCC. To date, SCC has resulted in a large inspection and repair cost in the nuclear industry and could eventually lead to premature decommissioning of BWR plants due to economic considerations.

A number of countermeasures have been developed to mitigate SCC in BWRs by sufficiently reducing either the stress level, the material susceptibility to cracking, or the "aggressiveness" of the environment. Of the various mitigation strategies, reducing the environmental aggressiveness (i.e., oxidizing potential) can provide the broadest, most comprehensive approach, since the environment contacts all the potentially susceptible surfaces of interest. The primary strategy to reduce the ECP of the water to some benign value has been to add hydrogen gas to the reactor feedwater in sufficient quantity that hydrogen is available to chemically recombine, in the presence of a radiation field, with dissolved oxygen and hydrogen peroxide to form water. This process is called hydrogen water chemistry (HWC).

If the hydrogen concentration is sufficient, the resultant ECP can be reduced below the SCC threshold value. As used herein, the term "threshold value" means a corrosion potential at or below a range of values of about –230 to –300 mV based on the standard hydrogen electrode ("SHE") scale. Stress corrosion cracking proceeds at an accelerated rate in systems in which the ECP is above the critical potential, and at a substantially lower rate in systems in which the ECP is below the critical potential. Water containing oxidizing species such as oxygen increases the corrosion potential of metals exposed to the water above the critical potential, whereas water with little or no oxidizing species present results in corrosion potentials below the critical potential.

In a BWR, the radiolysis of the primary water coolant in the reactor core causes the net decomposition of a small fraction of the water to the chemical products $H_2$, $H_2O_2$ and $O_2$. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote SCC in susceptible structural materials.

Figure 2:
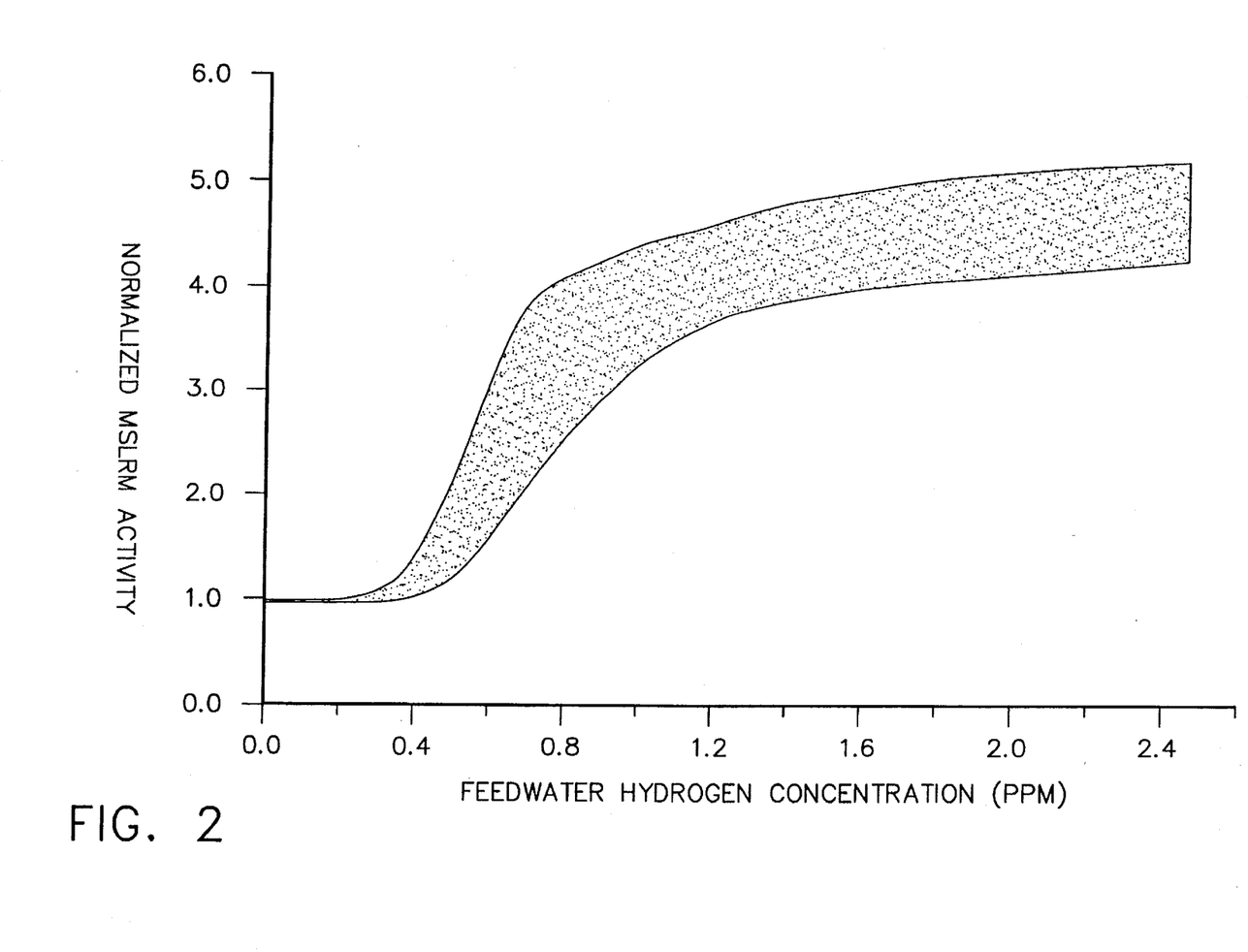
FIGS. 2 and 3 are graphs in which the main steam dose rate is plotted as a function of the feedwater dissolved hydrogen concentration for conventional BWRs.

When HWC is used to make the bulk coolant sufficiently reducing, the nitrogen isotope $^{16}$N, which is normally present in the water phase during reactor operation, partitions into the steam phase as it is reduced from a nonvolatile form (a highly oxidized form such as nitrate or nitrite) to a volatile form (a less oxidized form such as NO and eventually to a highly reduced form such as $NH_3$). This results in an increase in $^{16}$N gamma activity in the steam lines and turbine systems, which can exceed regulatory personnel radiation exposure limits at hydrogen addition levels needed for broad SCC protection. Feedwater hydrogen additions, e.g., of about 200 ppb or greater, that reduce the corrosion potential below the critical potential, can result in a higher radiation level in the steam-driven turbine section from incorporation of the short-lived $^{16}$N species, as shown in FIG. 2. For most BWRs, the amount of hydrogen addition required to provide mitigation of SCC of pressure vessel internal components results in an increase in the main steam line radiation monitor ("MSLRM") by a factor of greater than about four.

To reduce $^{16}$N gamma activity to acceptable levels at these plants, it is now necessary to add shielding at strategic locations, which can be costly. In most cases, this consideration has limited use of HWC to protection of only those components where the ECP can be reduced below the SCC threshold without a significant increase in steam-phase $^{16}$N.

SUMMARY OF THE INVENTION

The present invention improves upon known HWC techniques by catalyzing the reaction of undesirable volatile $^{16}$N-containing species which are present in the coolant of a BWR. These volatile species cause an undesirable increase in main steam and ultimately environmental dose rates. Thus the invention enables HWC conditions without the negative impact of increased main steam dose rates.

The invention is a passive catalytic ammonia converter operating in the water/steam mixture exiting the core of a BWR. As used herein, the term "catalytic converter material" means a solid material which serves as a catalyst for the conversion of NO or $NH_3$ to nitrite or nitrate.

The catalytic converter material in accordance with the invention is arranged and situated such that all (except perhaps a small leakage flow) of the water/steam mixture prior to entering the steam/water separator device flows over the surface of the catalytic converter material. The catalytic surfaces react to catalytically convert the $^{16}$N-containing species (ammonia or NO) to a nitrate or nitrite chemical form that partitions to the liquid phase prior to exiting from the steam separators. Radioactive nitrogen species such as $^{16}$N thus remain in the liquid phase. The catalytic converter is constructed from a material with a catalytically active surface that facilitates the reaction of ammonia and/or NO with oxygen or hydrogen peroxide to form $NO_2^-$ or $NO_3^-$ in the reactor pressure vessel prior to the steam separators.

The $^{16}$N is formed in the core region by the (n, p) reaction with oxygen from a water molecule:

$$^{16}O + n \Rightarrow {}^{16}N + p$$

It is believed that $^{16}$N reacts quickly with the species in the immediate liquid phase environment. Therefore, under oxidizing conditions, nitrate or nitrite is formed, and under reducing conditions an intermediate species such as NO is formed and eventually the highly reduced species $NH_3$ is formed. The following table shows the nitrogen oxidation states of various nitrogen compounds in the order of oxidized nitrogen to reduced nitrogen:

TABLE 1

| Nitrogen Compound | Nitrogen Oxidation State |
|---|---|
| $NO_3^-$, $N_2O_5$ | +5 |
| $NO_2$, $N_2O_4$ | +4 |
| $NO_2^-$, $N_2O_3$ | +3 |
| NO | +2 |
| $N_2O$ | +1 |
| $N_2$ | 0 |
| $N_2H_5^+$, $N_2H_4$ | -2 |
| $NH_4^+$, $NH_3$ | -3 |

Figure 3:
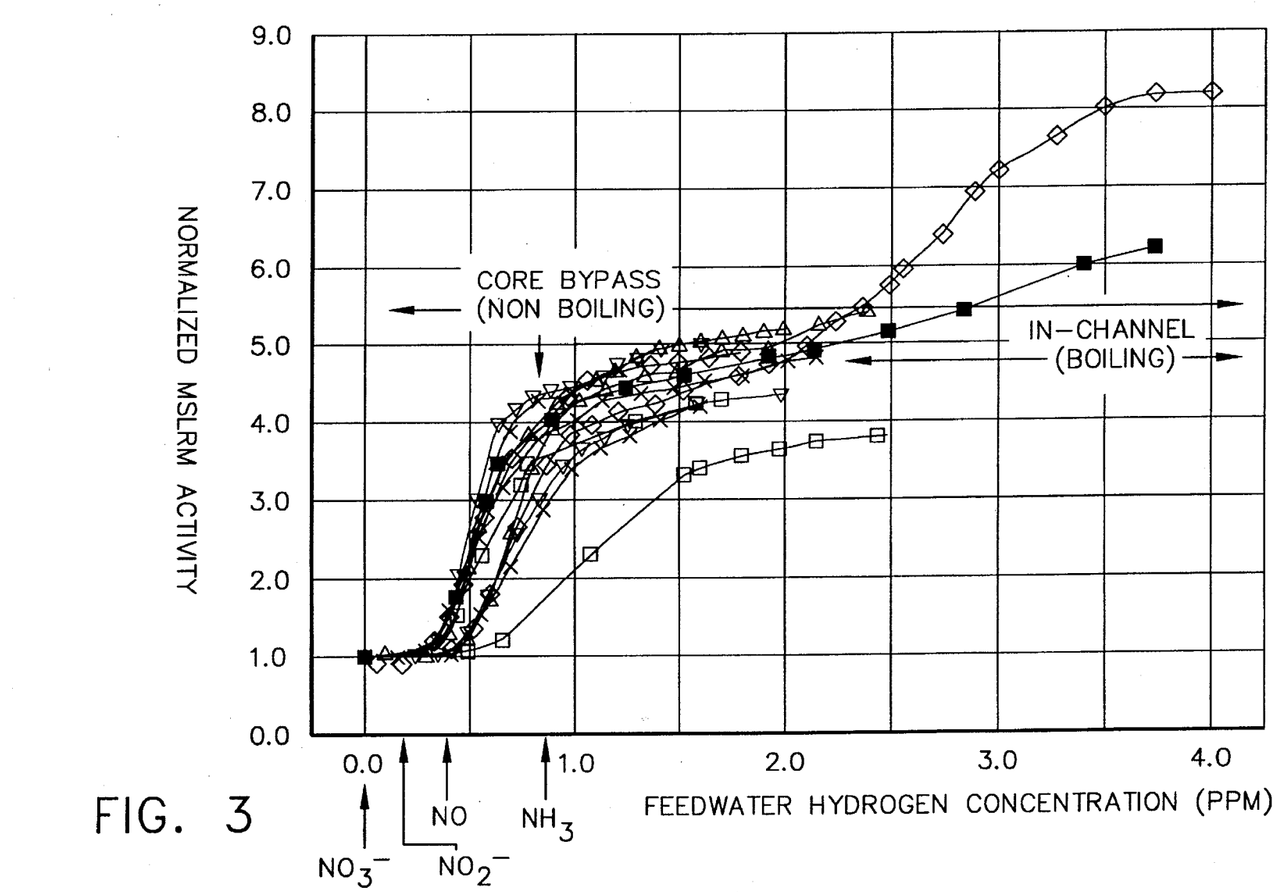
Figure 4:
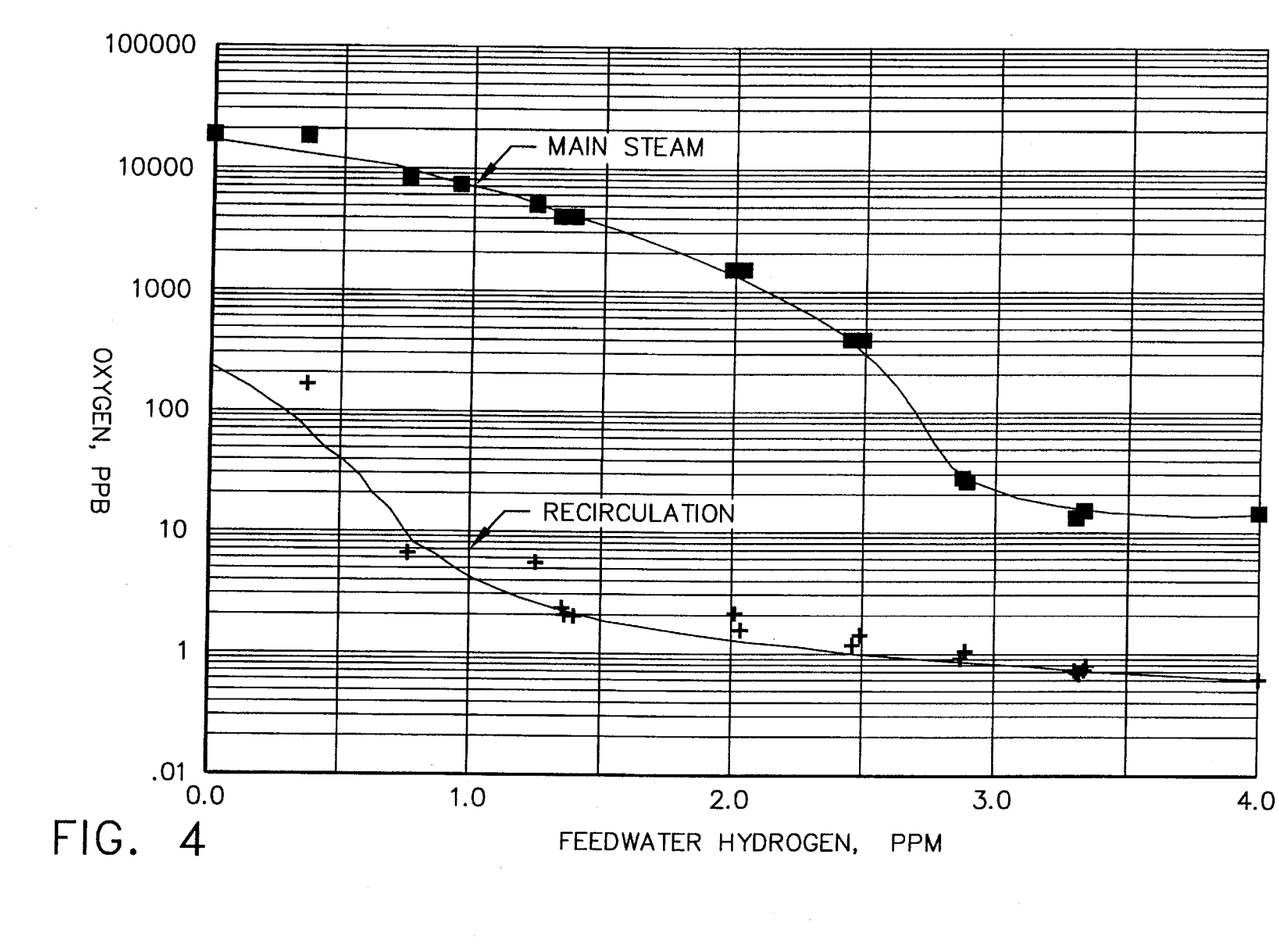
FIG. 4 is a graph in which the main steam condensate dissolved oxygen concentration is plotted as a function of the feedwater dissolved hydrogen concentration.

It is believed that under HWC conditions (typically feedwater $H_2 < 2$ ppm), the increased $^{16}$N activity in the steam results from production of intermediate species such as NO and eventually the ammonia species in the core bypass region (non-boiling region) as opposed to the in-channel region (boiling region). In the boiling region inside the fuel channels, most of the dissolved hydrogen and oxygen are stripped to the steam phase, leaving primarily hydrogen peroxide (an oxidizing species) in the liquid phase. The liquid phase of the boiling region remains oxidizing until very high feedwater hydrogen concentrations are reached (2 ppm). Two sources of data support the foregoing: (1) data from two BWRs suggests the existence of a second plateau in steam line dose rate; and (2) a significant amount of dissolved oxygen is still present in the main steam even at a feedwater hydrogen concentration of 2 ppm. FIG. 3 shows the second plateau in the main steam measurements. FIG. 4 shows main steam dissolved oxygen concentration as a function of feedwater hydrogen concentration for one plant where measurements were obtained for feedwater dissolved hydrogen concentrations up to 4 ppm.

At feedwater hydrogen concentrations less than 2 ppm, when water from the non-boiling and boiling regions mixes after passing through the reactor core, there is sufficient oxygen or oxidizing species to convert the ammonia and/or NO to a nitrate or nitrite species. The apparent reason why this reaction does not occur in current BWR designs is that the conversion reaction is too slow. The result is that volatile ammonia and/or NO containing the $^{16}$N isotope are carried along with the steam to the turbines, thereby increasing the main steam dose rate. With the proper catalyst, the oxidation reaction rate can be increased to facilitate the conversion reaction in the short time available before the mixture of water from the boiling and non-boiling regions reaches the steam separators.

Nitric acid is made from ammonia by the Ostwald process. Platinum catalyst is used in the first step, which is the oxidation of ammonia to nitrous oxide (NO):

$$4NH_3 + 5O_2 \Rightarrow 4NO + 6H_2O \text{ (Pt catalyst 1000° C.)}$$

The NO is then converted in air to $NO_2$, which then undergoes oxidation/reduction to $HNO_3$ and NO:

$$2NO + O_2 \Rightarrow 2NO_2 \text{ (Cooled in air)}$$

$$3NO_2 + H_2O \Rightarrow 2HNO_3 + NO \text{ (Warm water, NO recycled)}$$

The present invention relies on the combination of a noble metal catalyst or other oxidizing catalytic material device (in the desired location) and BWR high-temperature water to facilitate the reaction such that the fastest or dominant reactions are the following:

$$4NH_3 + 8O_2 + H_2O \xrightarrow{\text{catalyst}} 4HNO_3 + 5H_2O$$

$$4NO + 3O_2 + 6H_2O \xrightarrow{\text{catalyst}} 4HNO_3 + 4H_2O$$

If there is insufficient oxygen available for the reaction, oxygen might be added at a location downstream of the core and upstream of the catalytic device as long as the amount of oxygen in the water after the steam separators is insufficient to impact the SCC mitigation benefit of HWC. During HWC, oxygen gas is added to the offgas system, at a rate stoichiometrically equivalent to the feedwater hydrogen injection rate, to return the offgas system to normal water chemistry ("NWC") conditions.

Thus, the invention provides a means to substantially reduce or eliminate the undesirable ammonia and NO products of HWC, which will allow HWC operation without the side effect of higher main steam dose rates and thus higher environmental dose rates. The catalytic ammonia converter in accordance with the invention is passive if no oxygen injection is required.

In accordance with the preferred embodiment, the passive catalytic converter is constructed to ensure that the pressure drop of the reactor water across the device is very small (less than 5 psi). In addition, the catalytic material must be corrosion resistant in pure water under BWR conditions and have structural strength at reactor temperatures. The converter includes a stainless steel flow-through housing packed with catalytic converter material having a high surface area-to-volume ratio. One example of a suitable catalytic converter material is a pure noble metal such as platinum. However, other solid catalytic ammonia conversion materials having structural strength and corrosion resistance suitable for the BWR environment can be used.

DETAILED DESCRIPTION OF THE PREFERRED EMBODIMENTS

The fluid flow in a boiling water reactor will be generally described with reference to FIG. 1. Feedwater is admitted into reactor pressure vessel (RPV) 10 via an inlet 12. Inlet 12 is connected to feedwater sparger 14, which is a ring-shaped pipe having suitable apertures through which the feedwater is distributed inside the RPV. A core spray inlet 11 supplies water to a core spray sparger 15 via core spray line 13.

The feedwater from sparger 14 flows downwardly through the downcomer annulus 16, which is an annular region between the RPV and core shroud 18. Core shroud 18 is a stainless steel cylinder which surrounds the core 20 and separates the upward flow of coolant through the core from the downward flow in downcomer annulus 16.

Figure 1:
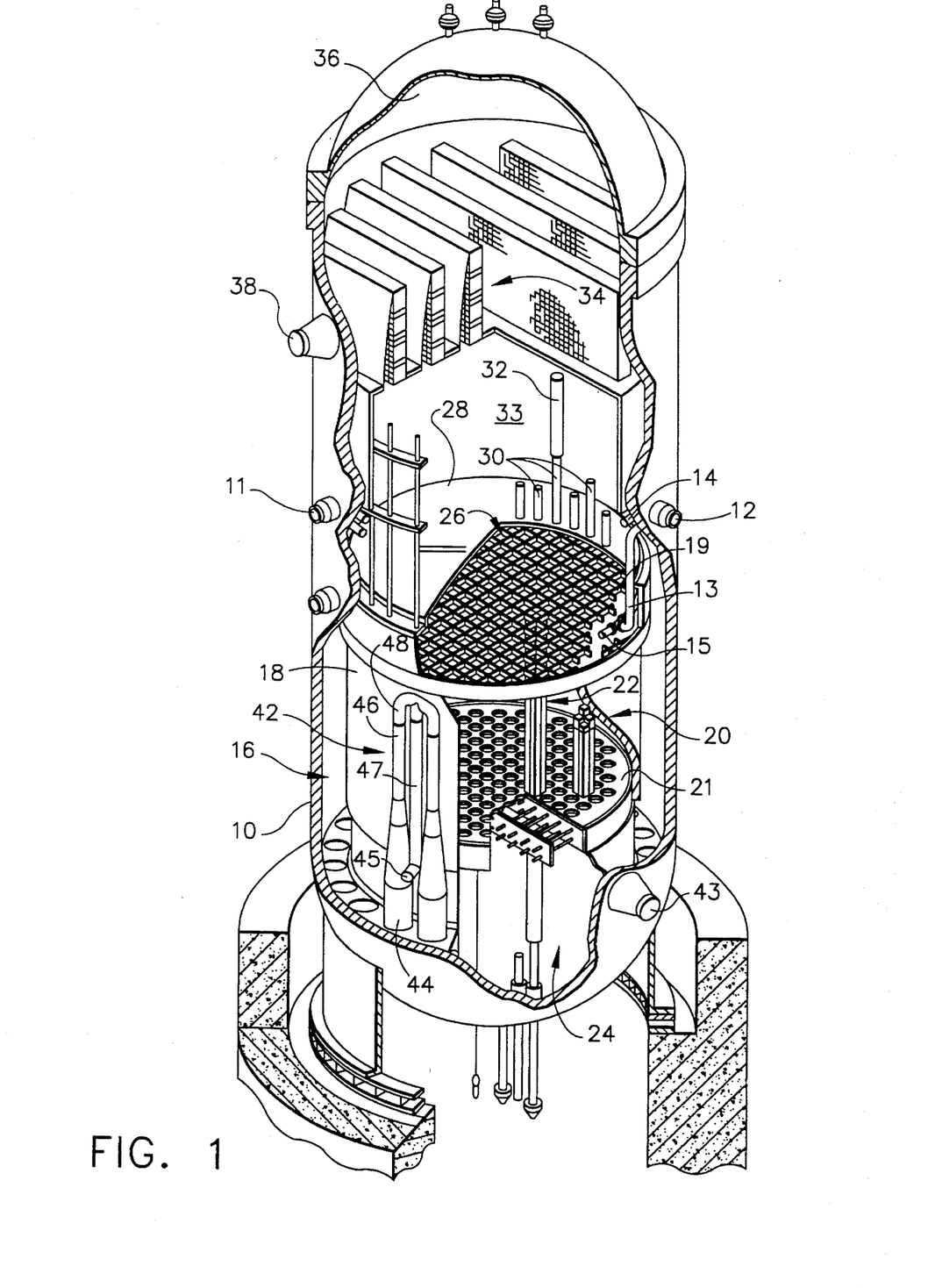
FIG. 1 is a schematic showing a partially cutaway perspective view of a conventional BWR.

Water flowing through downcomer annulus 16 then flows to the core lower plenum 24 and into core 20, which comprises numerous fuel assemblies 22 (only two 2×2 arrays of which are depicted in FIG. 1). Each fuel assembly typically consists of an 8×8 or 9×9 array of fuel rods surrounded by a fuel channel and supported at the top and bottom by top guide 19 and core plate 21, respectively. Water flows from the core lower plenum 24 into the fuel channels, wherein a boiling boundary layer (not shown) is established, thus causing a lower non-boiling region and an upper boiling region within the fuel channels.

Next, a mixture of water and steam enters core upper plenum 26 which is formed within shroud head 28 and disposed atop core 20. Core upper plenum 26 provides stand-off between the steam/water mixture exiting core 20 and entering vertical standpipes 30, the latter being disposed atop shroud head 28 and in fluid communication with core upper plenum 26.

Each standpipe 30 is in fluid communication with a steam separator 32 mounted thereon. The steam/water mixture flowing through standpipes 30 enters steam separators 32, which are of the axial-flow centrifugal type. These separators separate the liquid water from the steam by employing a swirling motion to drive the water droplets to the outer wall of the separator. The separated liquid water then mixes with feedwater in the mixing plenum 33, which mixture then flows to the core via the downcomer annulus. The liquid water elevation or level established within the RPV during normal operation of the BWR is designated by numeral 50 in FIG. 6. The steam passes through steam dryers 34 and enters steam dome 36. The steam is withdrawn from the RPV via steam outlet 38.

The BWR also includes a coolant recirculation system which provides the forced convection flow through the core necessary to achieve the required power density. A portion of the water is sucked from the lower end of the downcomer annulus 16 via recirculation water outlet 43 and forced by a centrifugal recirculation pump 40 (see FIG. 6) into jet pump assemblies 42 (only one of which is shown) via recirculation water inlets 45. This type of BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence.

Figure 9:
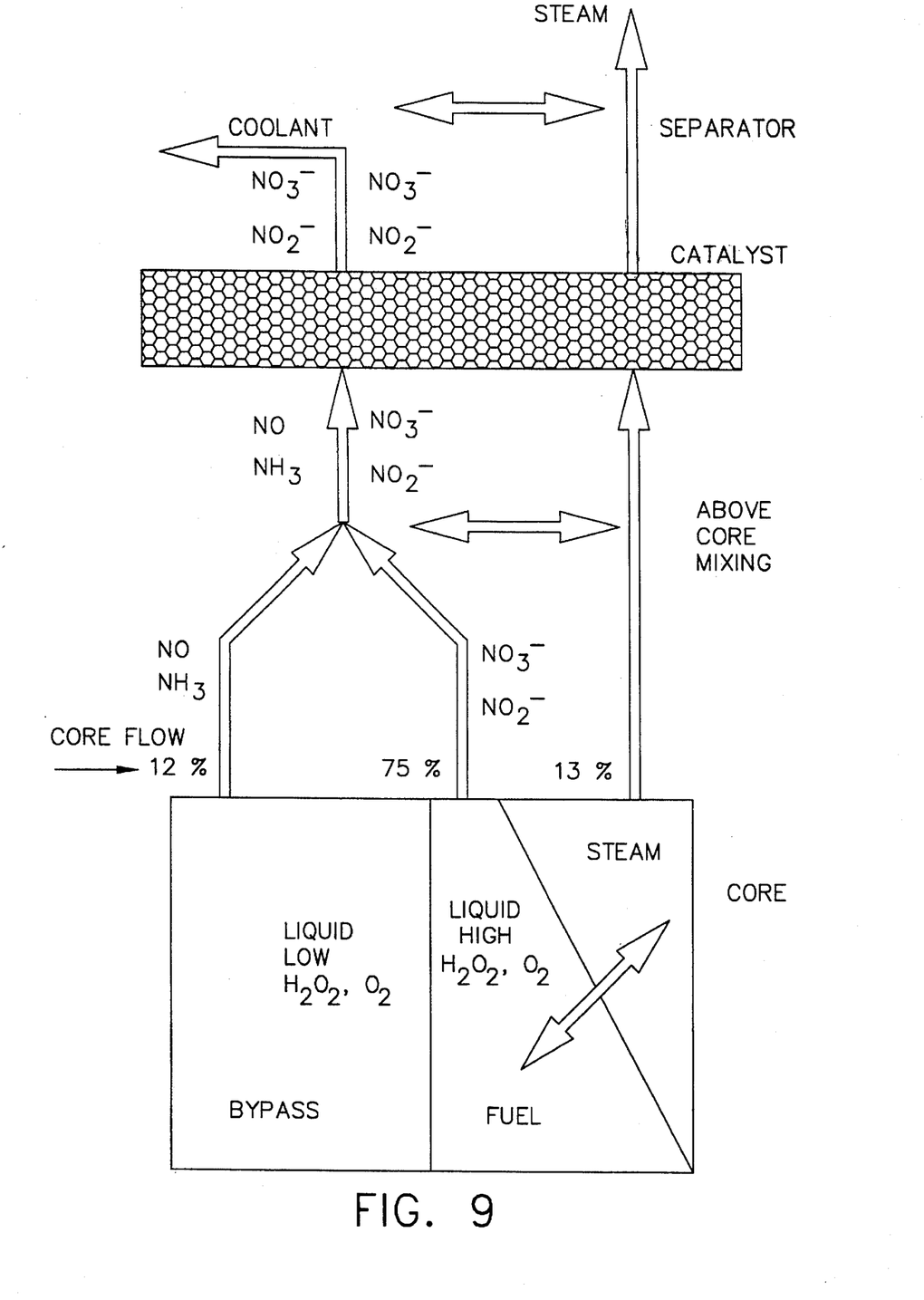
FIG. 9 is a flow diagram showing $^{16}N$ oxidation during HWC conditions in accordance with the invention.

As shown in FIG. 9, water radiolysis in the BWR core produces $H_2$, $O_2$ and $H_2O_2$. The $H_2O_2$ produced in the core is generally nonvolatile. Therefore, the $H_2$ and $O_2$ partition in the steam separators to go into the steam, while the $H_2O_2$ stays in the water phase and recirculates through the BWR. For HWC conditions, the major nitrogen species in the bypass flow are $NH_3$ and $NO$ due to the low concentrations of $O_2$ and $H_2O_2$ outside the fuel channels, whereas the major nitrogen species in the fuel channel flow are $NO_2^-$ and $NO_3^-$ due to the high concentrations of $O_2$ and $H_2O_2$ inside the fuel channels. The catalytic ammonia converter of the invention facilitates the reaction of $NH_3$ and $NO$ with $O_2$ or $H_2O_2$ to form $NO_2^-$ and $NO_3^-$ in the water/steam mixture exiting the core before it enters the steam separators. This reduces the amount of volatile gases containing the $^{16}N$ isotope which passes out of the reactor with the steam.

The net effect of this reduction in the $^{16}N$ isotope passing out of the reactor with the steam is that the feedwater dissolved hydrogen concentration can be increased without adversely affecting the main steam dose rate. The data in Table 2 (see next page), which were computed in accordance with a theoretical model, show that the oxidizing catalyst of the invention, when used in conjunction with bypass flow having a low $O_2/H_2$ controlling ratio, prevents an increase in the MSLRM which would be expected in the absence of oxidizing catalyst.

Figure 5:
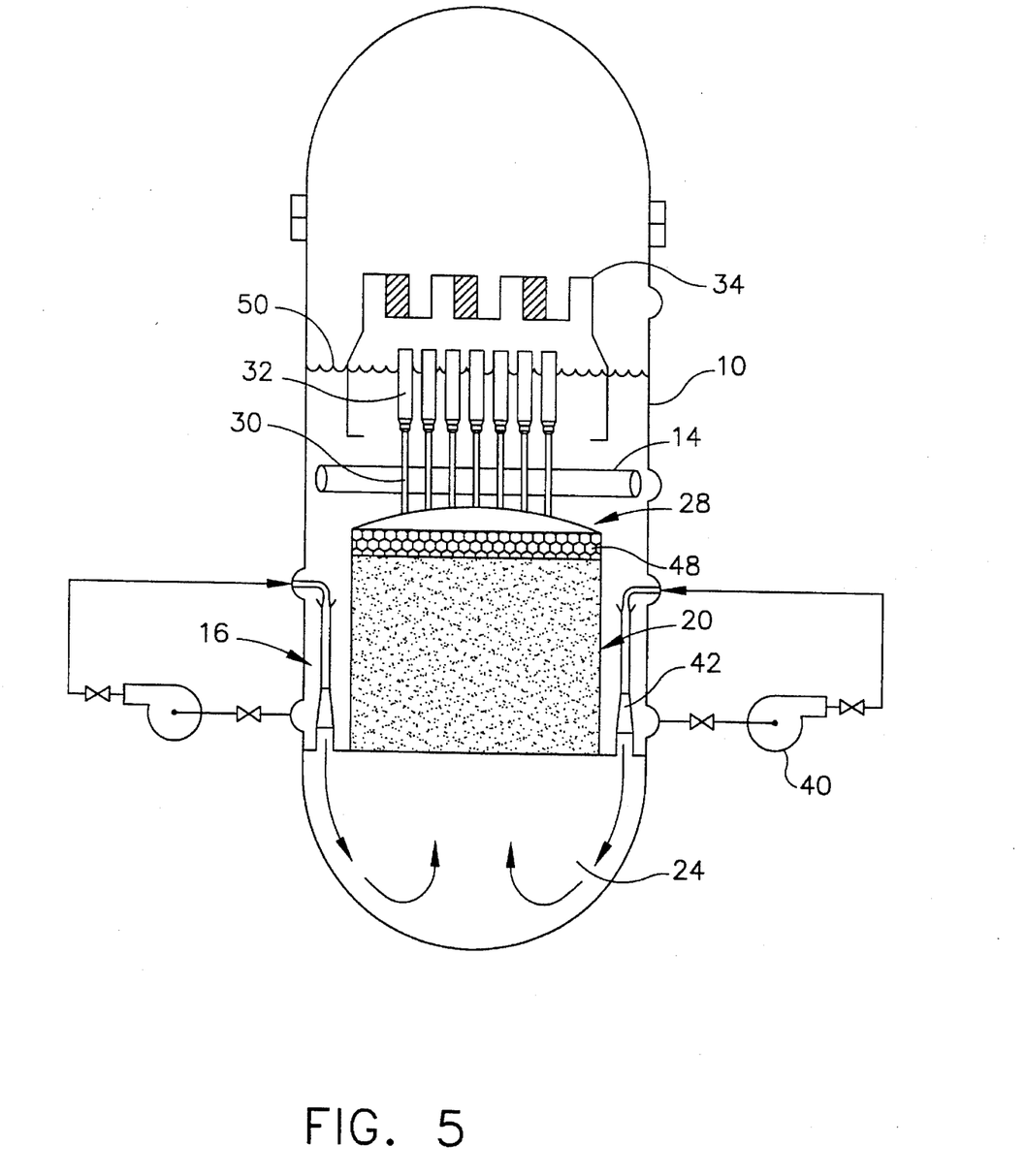
FIG. 5 is a schematic showing a catalytic ammonia converter installed in a BWR in accordance with a preferred embodiment of the invention.

In accordance with a first preferred embodiment of the invention, the catalytic ammonia converter, designated by 48 in FIG. 5, has a generally planar configuration and is installed between the core outlet and the steam separator inlet. The catalytic ammonia converter is permanently attached to the shroud head 28, so that it is removed when the shroud head and steam separator assembly are removed. In accordance with a second preferred embodiment, the catalytic ammonia converter material, designated by 48' in FIG. 6, is installed inside the standpipes 30 of the steam separator assembly which extend vertically from shroud head 28.

One advantage of installation in the shroud head or in the standpipes is that the volatile $^{16}N$-containing species are converted into nonvolatile species which remain in the recirculating coolant. Another advantage it that the catalytic ammonia converter of the invention is removed with the shroud head and steam separator assembly during refuelings. Thus, there would be no increase in refueling time associated with installation of a catalytic ammonia converter.

Figure 6:
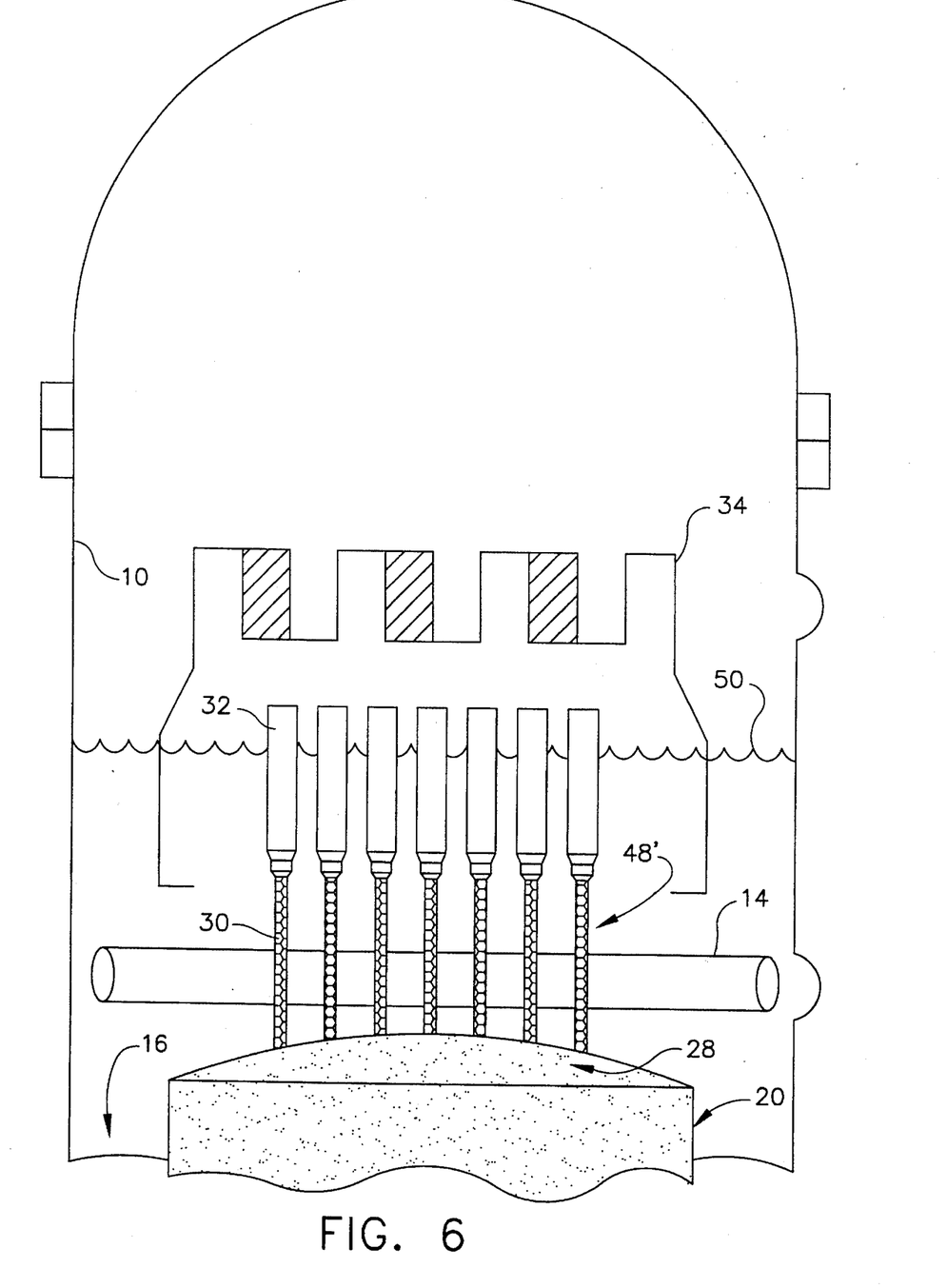
FIG. 6 is a schematic showing a catalytic ammonia converter installed in a BWR in accordance with another preferred embodiment of the invention.

FIGS. 5 and 6 respectively depict a cross section of the catalytic ammonia converter material. The honey-combed hatching is intended to symbolize an arrangement

TABLE 2

| Species | NWC | | | HWC (1.0 ppm) | | | HWC (2.0 ppm) | | |
|---|---|---|---|---|---|---|---|---|---|
| | Bypass (ppb) | Fuel (ppb) | Combine (ppb) | Bypass (ppb) | Fuel (ppb) | Combine (ppb) | Bypass (ppb) | Fuel (ppb) | Combine (ppb) |
| $H_2$ | 36 | 17 | 20 | 122 | 15.7 | 30.8 | 261 | 16.2 | 50 |
| $O_2$ | 105 | 176 | 166 | 0.1 | 140 | 121 | 0.1 | 110 | 95 |
| $H_2O_2$ | 776 | 578 | 605 | 65 | 519 | 456 | 51 | 473 | 415 |
| $O_2/H_2$ | 13.7 | 27.4 | 23.4 | 0.27* | 25.4 | 11.3† | 0.1* | 21.4 | 6.1† |
| Expected MSLRM | | | 1x | 4x* | | 1x† | 5x* | | 1x† |
| $NO_3^-$ | ● | ● | ● | | ● | ⊙ | | ⊙ | ⊙ |
| $NO_2^-$ | ○ | ○ | ○ | | ⊙ | ● | | ● | ● |
| NO | | | | ⊙ | | | ⊙ | | |
| $NH_3$ | | | | ● | | | ● | | |

*$O_2/H_2$ controlling ratio without oxidizing catalyst - N-16 in volatile form
†$O_2/H_2$ controlling ratio with oxidizing catalyst - N-16 volatiles converted to soluble form
●Major Species
⊙Minor Species
○Trace Species in which catalytic material having a high surface area is packed inside a volume and held in place by a stiffened metal mesh through which the water/steam mixture exiting the core flows. The catalytic ammonia converter material packed inside the shroud head or standpipes could take the form of tangled wire or foil strips, crimped ribbon, porous sintered metal composite, a honeycombed structure or any other structure having a high surface area-to-volume ratio. Other geometries would be suitable.

The catalytic material should be at least 6 inches thick in the direction of coolant flow. The typical residence time for water passing through the catalytic ammonia converter will be a few seconds or less. Upon passage of the water/steam mixture through the catalytic ammonia converter of the invention, $NH_3$ and NO is reacted with $O_2$ or $H_2O_2$ to form $NO_2^-$ and $NO_3^-$.

One example of a suitable catalytic ammonia converter material is a pure noble metal such as platinum. A key requirement of the catalytic ammonia converter material is that it must perform at the reactor operating temperature of the water/steam mixture exiting the core.

In accordance with a preferred example, each piece of catalytic ammonia converter material may be a strip 0.012 inch thick by 12.0 inches long. The minimum thickness of any component currently used in the RPV is 0.012 inch as part of the fuel spacers. Therefore, this thickness was chosen for the catalytic ammonia converter strips. The concern for small thicknesses is that pieces could break off and become lodged in the fuel assemblies, where they could cause local hot spots. The length of 12 inches was selected to prevent a piece from traversing the path from the control rod guide tube to the fuel rods.

The width requirements are more subjective. A reasonable width of 0.25 inch was selected based on fabrication concerns. A piece of this size can be formed into any required shape to facilitate packing.

Figure 7:
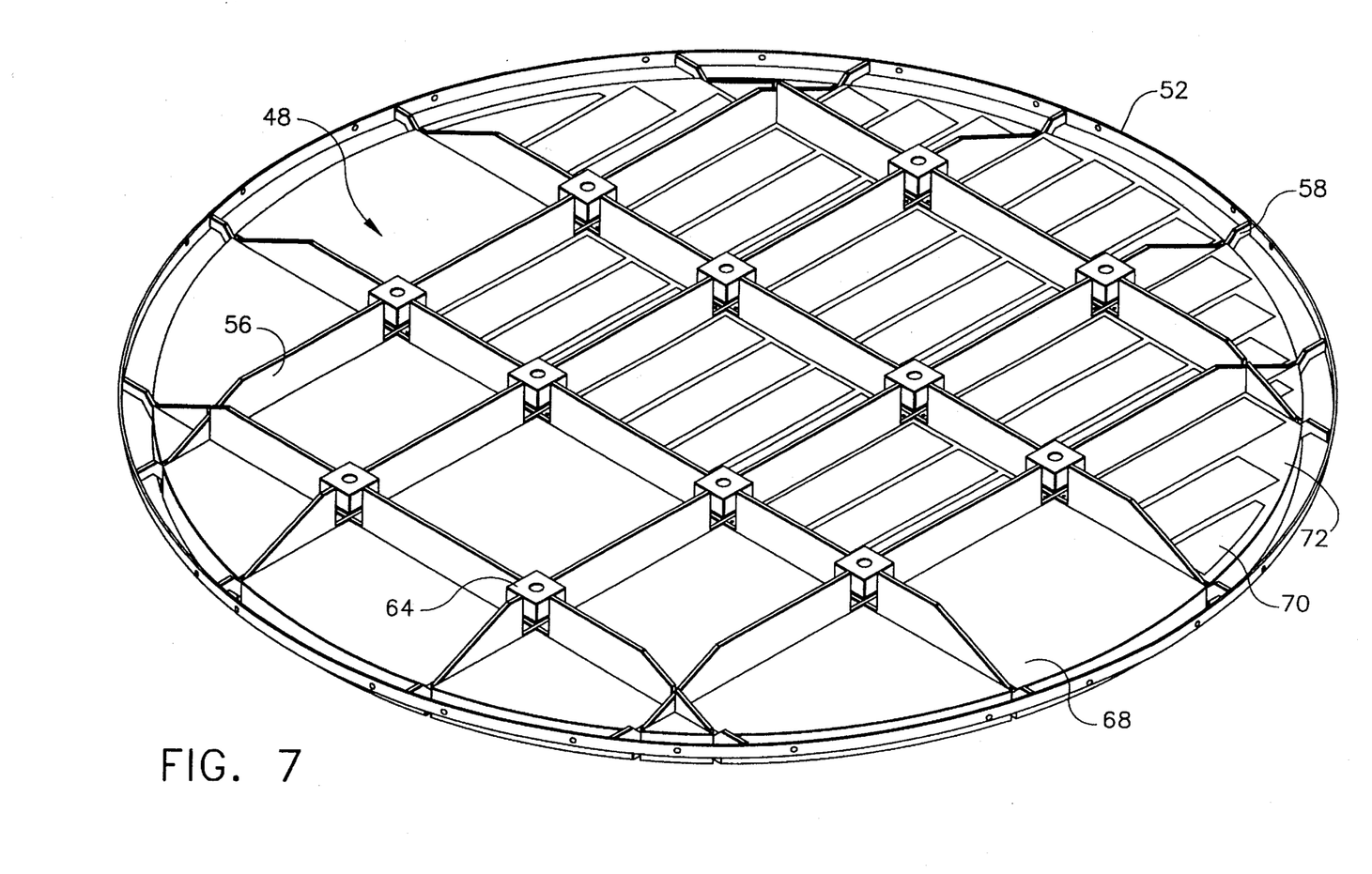
FIG. 7 is an isometric view showing in greater detail the catalytic ammonia converter installed in the shroud head in accordance with the preferred embodiment of FIG. 5.
Figure 8:
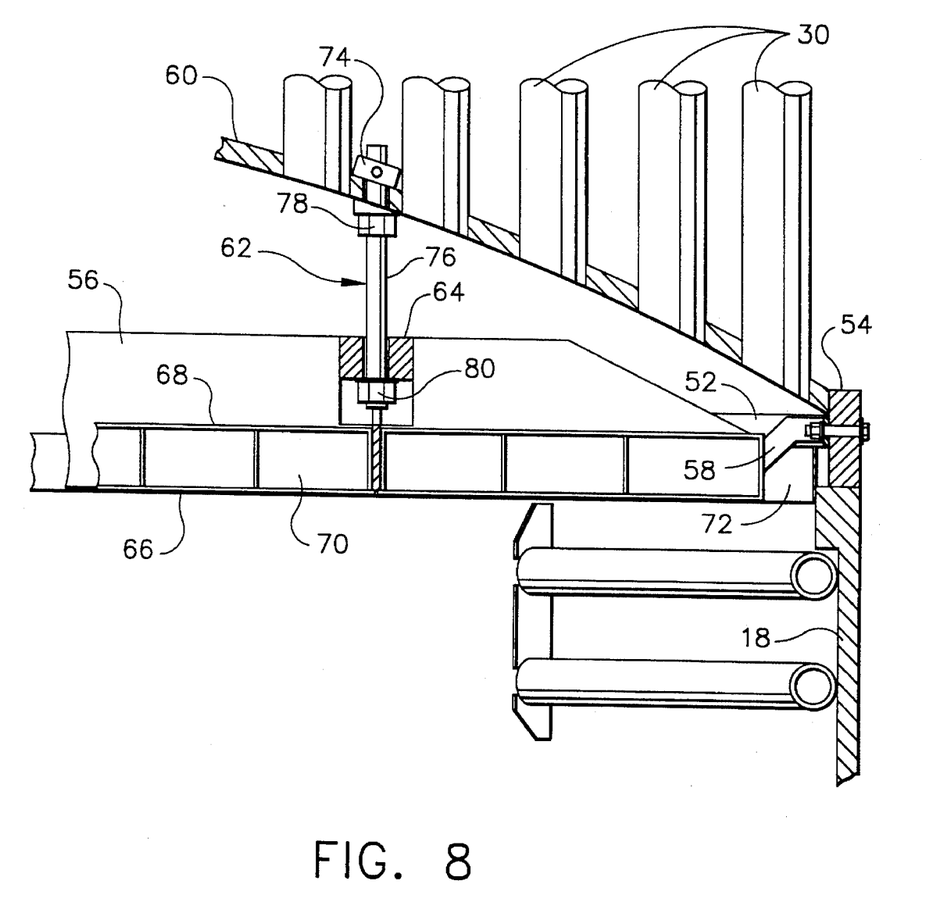
FIG. 8 is a sectional view of a portion of the catalytic ammonia converter shown in FIG. 7.

A specific design for a catalytic ammonia converter installed inside the shroud head is shown in FIGS. 7 and 8. The residence time for water passing through this catalytic ammonia converter will be approximately 0.2 sec. The pressure drop across the catalytic ammonia converter will be less than 5 psi. The structure of the catalytic ammonia converter of the invention must be designed to withstand vibrations induced by the two-phase flow exiting the core.

The total weight of the catalytic ammonia converter will be approximately 25,000 pounds. The weight of a 251-inch RPV shroud head assembly is approximately 125,000 pounds. The weight of the catalytic ammonia converter was estimated by assuming that 90% of the catalytic ammonia converter volume would be open and 10% would be solid metal. Thus, the catalytic ammonia converter weighs approximately 50 pounds per cubic foot of volume plus the weight of the support structure.

Referring to FIGS. 7 and 8, the catalytic ammonia converter structure comprises a ring 52 which is bolted to the shroud head flange 54 and a grid of beams 56 supported by the ring. At the beam intersections, beams 56 are welded to a plurality of blocks 64, each block having a square cross section and a cylindrical vertical bore therethrough. The beams are sized to tolerate the expected flow-induced vibration.

The beams are partly supported by the ring via brackets 58 welded to the beams and ring. The beams are further supported by the shroud head dome 60 via a group of specially designed bolts 62, each having a T-bar 74 rotatably mounted near one end of a threaded pin 76. After a plurality of holes are formed in the dome, the pin 76 and T-bar 74 of each bolt are aligned and inserted, first through the bore in corresponding block 64 and then through the corresponding hole in the dome. Once on the other side of the dome, the T-bar 74 is rotated to block removal of the pin 76 and the pin is locked in place by tightening of nut 78. The lower threads of each bolt 62 cooperate with the threads of a corresponding nut 80. The force of nuts 80 bearing against the bottom surfaces of blocks 64 helps to support the catalytic ammonia converter structure.

The exemplary design depicted in FIG. 7 has eight beams and twelve specially designed bolts. However, the precise number of beams or bolts is not critical to the invention so long as structural requirements are met.

The catalytic ammonia converter in accordance with the preferred embodiment further comprises a bottom perforated plate 66 which is welded to the lower edges (see FIG. 8) of beams 56. The bottom perforated plate and the grid of beams form an array of zones in which individual boxes packed with catalytic material can be placed. Each box has perforated walls. FIGS. 7 and 8 show an arrangement wherein three boxes 70 are placed in each zone. The boxes are welded to the bottom perforated plate 66. Then a plurality of top perforated plates 68 are welded to the top of the boxes, one plate per zone, and to the adjacent beams.

Each box 70 is a stainless steel flow-through housing packed with catalytic ammonia converter material, which could take the form of tangled wire or foil strips, crimped ribbon, porous sintered metal composite, a honeycombed structure or any other structure having a high surface area-to-volume ratio. The walls of the boxes have small holes which allow the water/steam mixture to flow through.

The boxes 70 differ in dimension and shape to the extent needed to conform the catalytic ammonia converter to the geometry of the shroud head dome 60. The flow path through the catalytic ammonia converter material is preferably at least 6 inches. There is a minimum of 2 inches of clearance between the catalytic ammonia converter and any part of the reactor assembly that is stationary. Therefore, the catalytic material of the ammonia converter will not overlie portions 72 of the cross-sectional area of the shroud head adjacent the shroud head flange 54, where the height of the dome is reduced. These areas 72 between ring 52 and the catalytic ammonia converter material must be blocked to prevent the flow from bypassing the catalytic ammonia converter, e.g., by non-perforated stainless steel plates. If the catalyst thickness is increased beyond 6 inches, the flow area is further reduced due to the need to maintain a minimal clearance between the catalytic ammonia converter and the shroud head dome.

The water/steam mixture exiting the core flows upwardly through the perforations in the bottom plate 66, through the catalytic material packed in the perforated boxes 70, through the perforations in the top plates 68, and then into the standpipes 30 of the steam separation assembly. As previously described, the box housing may take the form of a stiffened metal mesh with catalytic ammonia converter material packed inside the housing.

The specific embodiment shown in FIGS. 7 and 8 has been described in detail for the purpose of illustration only. Although it shows the catalytic ammonia converter suspended in the shroud head, a practitioner of ordinary skill in the art of nuclear reactor engineering will be able to design other methods for installing such a converter. The geometry and location of the catalytic ammonia converter in accordance with the invention will depend on the specific design of the BWR in which the catalytic ammonia converter is to be installed. However, the catalytic ammonia converter for any given type of BWR must be designed to ensure that virtually all of the water/steam mixture entering the steam/water separator device flows over the surface of the catalytic ammonia converter material.

We claim:

1. In a nuclear reactor comprising a core of nuclear fuel elements, a downcomer annulus between a pressure vessel and said core, means for feeding feedwater into said pressure vessel, means for forcing said feedwater to flow through said core to cool said fuel elements, and means for separating steam and water phases in the mixture exiting said core, said water phase flowing from said steam/water separating means to said downcomer annulus, the improvement wherein catalytic ammonia conversion means are arranged upstream of said steam/water separating means and downstream of said fuel elements, said catalytic ammonia conversion means comprising catalytic material arranged in an open structure disposed so that substantially all of the water/steam mixture entering said steam/water separating means flows therethrough, and said catalytic material having a surface area-to-volume ratio sufficiently high enough to catalyze the conversion of ammonia and/or NO in said water/steam mixture into nitrite or nitrate.

2. The nuclear reactor as defined in claim 1, wherein said catalytic ammonia conversion means comprise containment means in which said catalytic material is packed, said containment means having openings which enable water and steam phases to flow through said containment means, but which are not of a size to allow escape of said catalytic material therefrom.

3. The nuclear reactor as defined in claim 2, wherein said catalytic ammonia conversion means has a generally planar structure.

4. The nuclear reactor as defined in claim 3, further comprising a core shroud and a shroud head, wherein said catalytic ammonia conversion means is mounted inside said shroud head between said fuel elements and said steam/water separating means.

5. The nuclear reactor as defined in claim 2, further comprising a core shroud, a shroud head and a plurality of standpipes connected to said shroud head, wherein said catalytic ammonia conversion means is installed in said standpipes.

6. The nuclear reactor as defined in claim 1, wherein said catalytic material comprises entangled wires or strips.

7. The nuclear reactor as defined in claim 1, wherein said catalytic material comprises crimped ribbon.

8. The nuclear reactor as defined in claim 1, wherein said catalytic material comprises a porous sintered composite material.

9. A nuclear reactor comprising a core of nuclear fuel elements, a downcomer annulus between a pressure vessel and said core, means for feeding feedwater into said pressure vessel, means for forcing said feedwater to flow through said core to cool said fuel elements, means for separating steam and water phases in the mixture exiting said core, said water phase flowing from said steam/water separating means to said downcomer annulus, and means for catalyzing the conversion of ammonia and/or NO in said water/steam mixture into nitrite or nitrate, wherein said means for catalyzing ammonia conversion are arranged upstream of said steam/water separating means and downstream of said fuel elements and comprise catalytic material arranged in an open structure disposed so that substantially all of the water/steam mixture flows therethrough before entering said steam/water separating means.

10. The nuclear reactor as defined in claim 9, wherein said means for catalyzing ammonia conversion comprise containment means in which said catalytic material is packed, said containment means having openings which enable water and steam phases to flow through said containment means, but which are not of a size to allow escape of said catalytic material therefrom.

11. The nuclear reactor as defined in claim 9, wherein said means for catalyzing ammonia conversion has a generally planar structure.

12. The nuclear reactor as defined in claim 11, further comprising a core shroud and a shroud head, wherein said means for catalyzing ammonia conversion is mounted inside said shroud head between said fuel elements and said steam/water separating means.

13. The nuclear reactor as defined in claim 11, further comprising a core shroud, a shroud head and a plurality of standpipes connected to said shroud head, wherein said means for catalyzing ammonia conversion is installed in said standpipes.

14. The nuclear reactor as defined in claim 10, wherein said catalytic material comprises tangled or crimped solid material.

15. The nuclear reactor as defined in claim 10, further comprising a grid of beams for supporting said containment means, a bottom perforated plate welded to said grid and to said containment means, and a plurality of top perforated plates welded to said containment means, wherein said containment comprises a plurality of perforated housings placed in the interstices of said grid and sandwiched between said top and bottom perforated plates.

16. A method for reducing the amount of $^{16}N$ isotope in the steam exiting a nuclear reactor, comprising the step of:

catalyzing the reaction of a first nitrogen compound having a first predetermined oxidation state with $O_2$ or $H_2O_2$ in a water/steam mixture flowing out of the nuclear fuel core of said reactor to form a second nitrogen compound having a second predetermined oxidation state, said first predetermined oxidation state being less oxidizing than said second predetermined oxidation state.

17. The method as defined in claim 16, wherein said first nitrogen compound is ammonia and said second nitrogen compound is a nitrite or a nitrate.

18. The method as defined in claim 17, wherein said nitrite is $NO_2^-$.

19. The method as defined in claim 17, wherein said nitrate is $NO_3^-$.

20. The method as defined in claim 16, wherein said first nitrogen compound is NO and said second nitrogen compound is a nitrite or a nitrate.

* * * * *